United States Patent
Wilkens et al.

[11] Patent Number: 6,161,368
[45] Date of Patent: Dec. 19, 2000

[54] BALER FOR HARVESTED CROPS

[75] Inventors: Dieter Wilkens, Wolfenbüttel-Ahlum; Jürgen Röhrbein, Wahle, both of Germany

[73] Assignee: Welger GmbH, Wolfenbüttel, Germany

[21] Appl. No.: 09/353,231

[22] Filed: Jul. 14, 1999

[30] Foreign Application Priority Data

Jul. 14, 1998 [DE] Germany .......................... 198 31 506

[51] Int. Cl.[7] .................................................. A01D 37/00
[52] U.S. Cl. ............................................................ 56/341
[58] Field of Search ............................ 56/341, 343, 432, 56/433

[56] References Cited

U.S. PATENT DOCUMENTS 3,612,309  10/1971  Van Doorn et al. .
3,817,405   6/1974  Neely, Jr. .
3,926,319  12/1975  Neely, Jr. .
5,263,410  11/1993  Olin ...................................... 56/341 X
5,479,766   1/1996  Ranson ..................................... 56/341

*Primary Examiner*—Christopher J. Novosad
*Attorney, Agent, or Firm*—Brown & Wood, LLP

[57] ABSTRACT

A baler for forming rectangular bales from harvested crop and including a baling channel having an inlet opening, a pressure piston reciprocating in the baling channel and periodically closing and opening the inlet opening, a continuously driven rake conveyor for delivering the harvested crop through the inlet opening of the baling channel synchronously with reciprocating movement of the pressure piston, a switch mechanism for periodically turning off the rake conveyor, and a brake for retraining the rake conveyor for at least one delivery period in its undelivering position outside of a delivery channel, and a control unit for turning on the rake conveyor synchronously with the reciprocating movement of the pressure piston.

10 Claims, 4 Drawing Sheets

BALER FOR HARVESTED CROPS

BACKGROUND OF THE INVENTION

1. Field of the Invention

The present invention relates to a baler for forming rectangular bales from harvested crop and including a baling channel having an inlet opening, a pressure piston reciprocating in the baling channel and periodically closing and opening the inlet opening of the baling channel, a continuously driven rake conveyor for delivering the harvested crop through the inlet opening of the baling channel synchronously with the reciprocating movement of the pressure piston, and an overload clutch for separating the rake conveyor from its drive upon overload of the rake conveyor for a delivery time period and for automatically connecting the rake conveyor with its drive upon expiration of the delivery time period.

2. Description of the Prior Art

An important precondition for forming uniform, high-density square bales is an adequate filling of the baling chamber or channel. An adequate filling should be insured with both thin swaths containing little crop and thick swaths containing a large amount of crop, and at different operational speeds. Only in this case, desired density and shape of bales can be obtained. Prior art discloses a number of solution for effecting an adequate filling of the baling channel.

German Publication DE 2748594 A1 discloses a method and an apparatus for loading of the crop with a continuously driven rotary conveyor and with a stuffer means for pushing a packing into the baling channel, with the conveyor being actuated by a single turn coupling, and driven synchronously with the pressure piston. Here, it is important that during the formation of bales, always, crop packages, which have as uniform size as possible be pushed into the baling channel. At the underside of the baling channel, there is provided a delivery channel which is closed by the rotary conveyor and serves as a storage space. The stuffer means is only then actuated by a claw coupling when the density probe in the delivery channel generates a signal indicating that a crop package with a desired size and/or thickness has been provided, and the baling channel opening is open by the pressure piston.

If the apparatus operates at a full capacity and a large-volume swath and/or at a greater speed, at the beginning of each piston cycle, a complete load of the crop is provided, and the stuffer means operates without interruptions. When the swath is small and the crop is moistened, from three to five pressure piston strokes (idle strokes) take place per a single stroke of the stuffer means. The drawback of the apparatus disclosed in DE 2748594 A1 consists in that as an overload clutch, which protects the stuffer means from overload, a shear bolt is used, with all of its known drawbacks.

In a baler which is disclosed in German Publication DE 4216483 A1, the rotary conveyor and the stuffer means are integrated in a single unit with a rake conveyor having an overload clutch. The overload clutch separates the rake conveyor from its drive for a time period corresponding to the time period of the pressure piston stroke when a predetermined load of the rake conveyor is exceeded by an amount corresponding to the response torque of the clutch. A serious drawback of this baler consists in that with thin swath containing little crop, an insufficient amount of crop accumulates in the delivery channel. As a result, the filling of the upper region of the baling channel is poor, and "banana"-shaped bales are formed.

German Publication DE 19627397 suggests that the rake conveyor of DE 4216483 A1 be driven, when the swath is thin, with a rotational speed equal to a half of the rotational speed of the crank drive of the pressure piston. i.e., the pressure piston performs two strokes per each delivery stroke of the rake conveyor, with one stroke of the pressure piston being, thus, idle. To provide for the reduction of speed of the rake conveyor, switch gear is of no use.

Accordingly, an object of the present invention is to improve the filling of the baling channel of the baler, which is disclosed in German Publication DE 4216483 A1, in particular with a thing swath with little material, without substantially changing the conveying and/or stuffer means, and to provide for use of the invention with stuffer means having either controllable or uncontrollable rakes. Another object of the present invention is to provide simple control means for operating the units of the baler according to the present invention.

SUMMARY OF THE INVENTION

These and other objects of the present invention are achieved by providing a switch mechanism for an intermittent turning-of of the rake conveyor, means for retaining the rake conveyor for one or several delivery strokes, in an undelivering position of the conveyor outside of the delivery channel, and means for restarting the rake conveyor synchronously with the reciprocating movement of the pressure position. Thereby, which retaining the overload clutch function, there is provided a switch function, which is independent from the applied torque, for turning off the rake conveyor, if needed, for collecting a crop package of predetermined size and density in the delivery channel. The turned-off period is either preset or, e.g., is controlled dependent on the filling level of the crop in the delivery channel, so that an adequate filling of the delivery channel is insured before the actuation of the rake conveyor synchronously with the movement of the pressure position. The re-actuation or restarting of the rake conveyor can also be controlled by another parameter dependent from, e.g., the load applied to the rake conveyor. This permits to avoid overload of the rake conveyor upon re-starting. Rake conveyors both with controllable and uncontrollable rates can be used without substantial constructional changes. With a sufficient swath mass, the switch mechanism performs only the conventional overload-protecting function.

According to a preferred embodiment of the present invention, the switch mechanism is formed as a one-turn clutch, a call-shaped clutch, a cam clutch, or a wedge clutch that separates the rake conveyor from a rake conveyor drive for a period equal to a time period of at least one pressure piston stroke.

Such clutches are partially available on the market and are further equipped with means for coupling or uncoupling the locking member.

A particularly easy control of the switch mechanism is achieved when the switch mechanism includes a switch element rotatable together with the drive member and displaceable by a locking element pivotal into a path or a trajectory of the switch element. The switch element can be secured to its support but with a possibility of performing a pivotal movement.

According to a further embodiment of the invention, for retaining the rake conveyor in its undelivering position outside of the delivery channel, a instantaneous brake can be associated with the rake conveyor and which can be formed, e.g., as a hydraulic or an electromechanical brake.

Advantageously, the actuation of the instantaneous brake is coupled with actuation of the switch mechanism so that the turn-off and retaining functions or the turn-on on brake-releasing functions are effected simultaneously or with a predetermined phase shift. For restarting the rake conveyor, the brake can be released, e.g., shortly before the restarting action. This permits to reduce the starting shock and to use fewer damping elements.

A high throughput, high density and uniform shape of the bales is achieved when the switch mechanism according to the present invention is used with a baler the rake conveyor of which is formed as a plurality of rotatable segment members supported next to each other on a common rotational axle, with the segment members passing through the pressure piston. Such balers combine the advantages of a high throughput, by which the balers having segmented rates passing through the pressure piston and throwing the crop in front of the end face of the pressure piston, are characterized, with advantages of good filling properties by which the balers having a pre-pressing chamber or storage space are characterized. Thus, the baler with a switch mechanism according to the present invention has a high throughput and insures an adequate filling of the baling channel even with a thin swatch. The baler with a switch mechanism according to the invention insures the formation of bales having a desized density and shape, while operating with a high throughput.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

DETAILED DESCRIPTION OF THE PREFERRED EMBODIMENT

Figure 1:
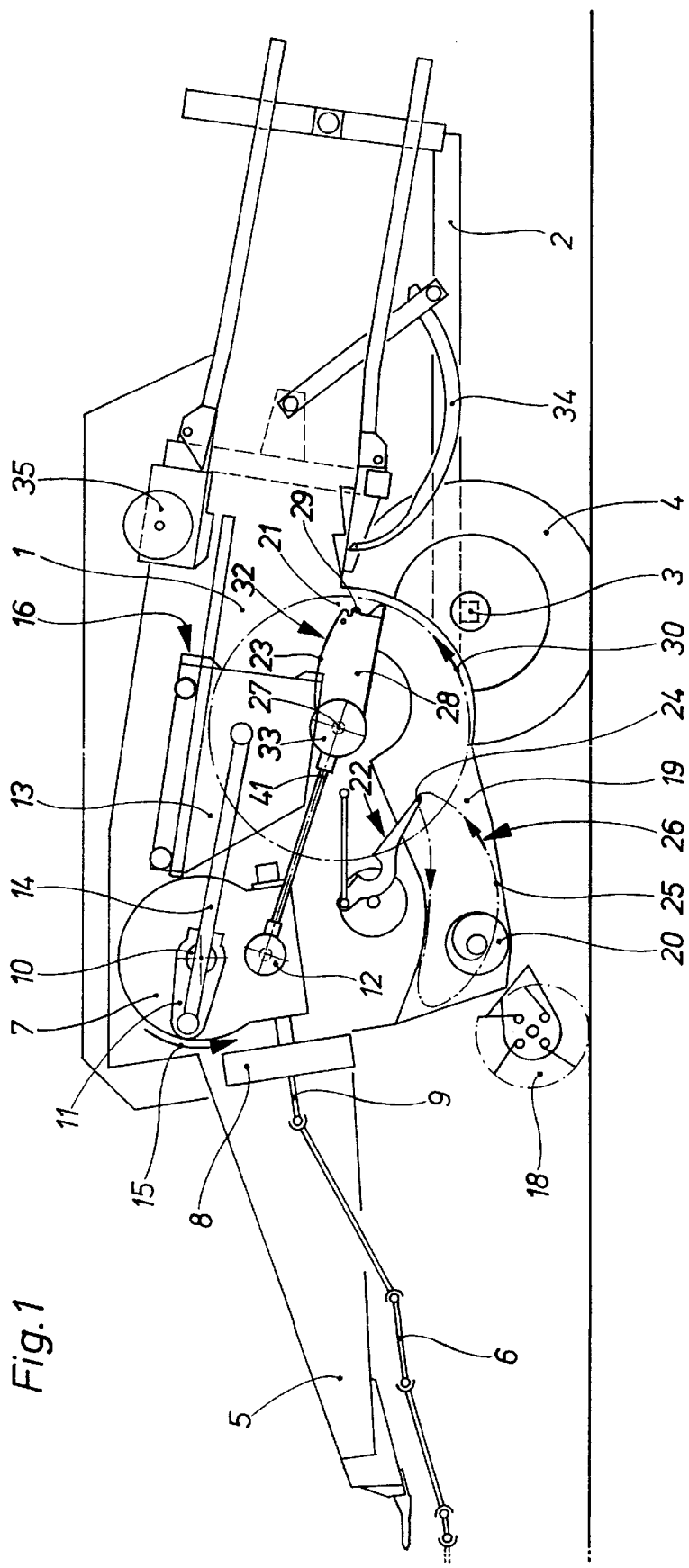
FIG. 1 shows a schematic side view of a conventional baler.

A conventional baler, which is shown in FIG. 1, has a baling channel 1 supported on a mount 2. The mount 2 carries a running wheel axle 3 on which running wheels 4 are supported. The baler is connected to a tractor (not shown) by a drawbar 5 and is driven by the tractor drive to which it is connected by a universal joint shaft 6 connectable with the power take-off shaft of the tractor drive.

A main drive 7 of the baler, which is provided with a fly wheel 8, is arranged in the front section of the baling channel 1. The drive 7 includes a forward drive shaft 9 connectable with the universal joint shaft 6, and a cross-shaft 10 which projects from opposite sides of the main drive housing. At each of its opposite ends, the cross-shaft 10 carries an operating crank 11. The main drive 7 also includes a power take-off gear 12 for driving operational elements of the baler.

A pressure piston 13 is arranged in the middle section of the baling channel. The pressure piston 13 is connected with the operating cranks 11 by two connecting rods 14 extending parallel to each other. Upon rotation of the cross-shaft 10 in a direction indicated by arrow 15, the pressure piston 13 reciprocates between its front end position 16, which is indicated with solid lines, and its rear end position 17 which is indicated by dash-dot lines.

Figure 2:
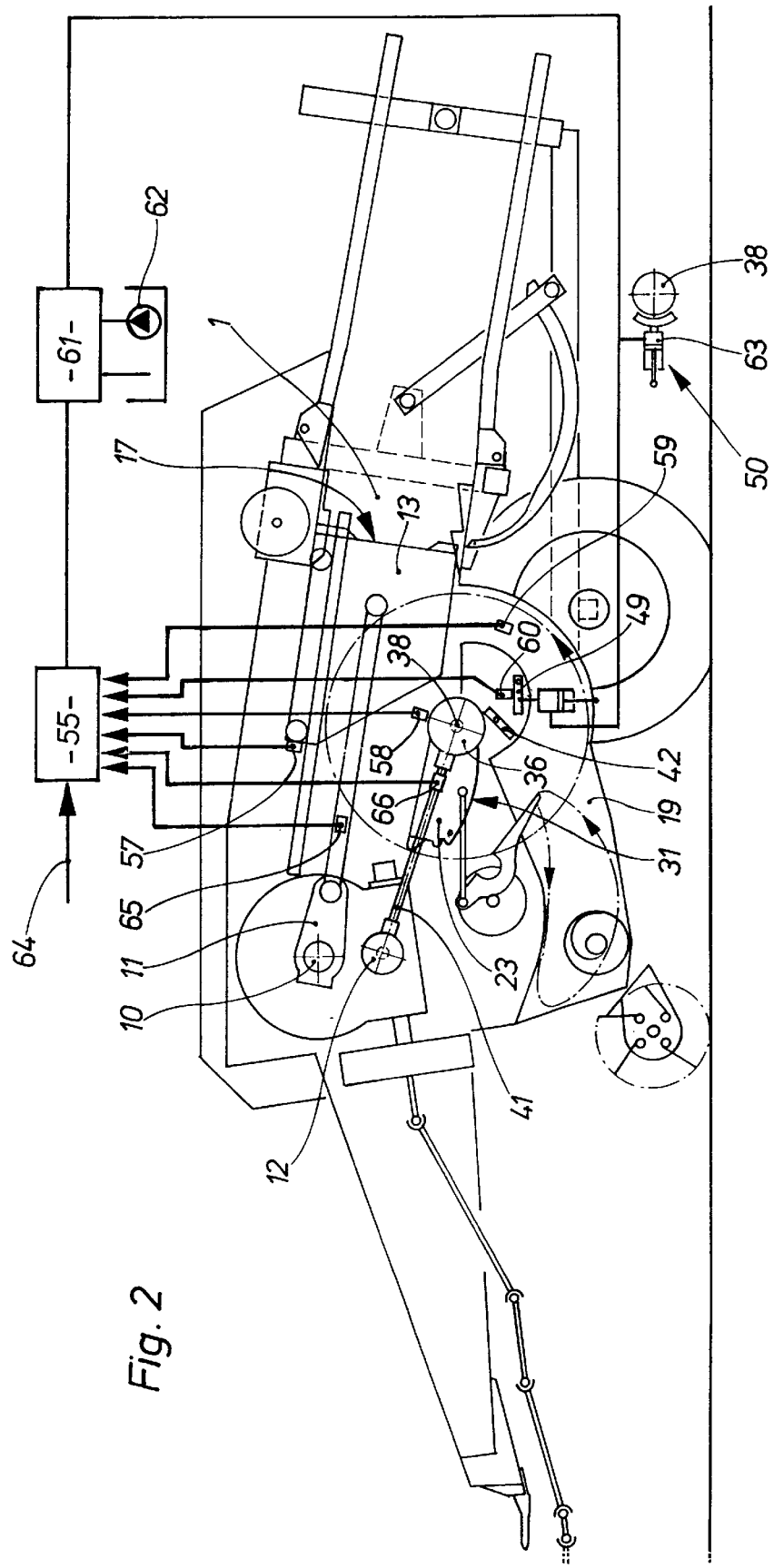
FIG. 2 shows a schematic side view of a conventional baler with a switch mechanism according to the present invention.
Figure 3:
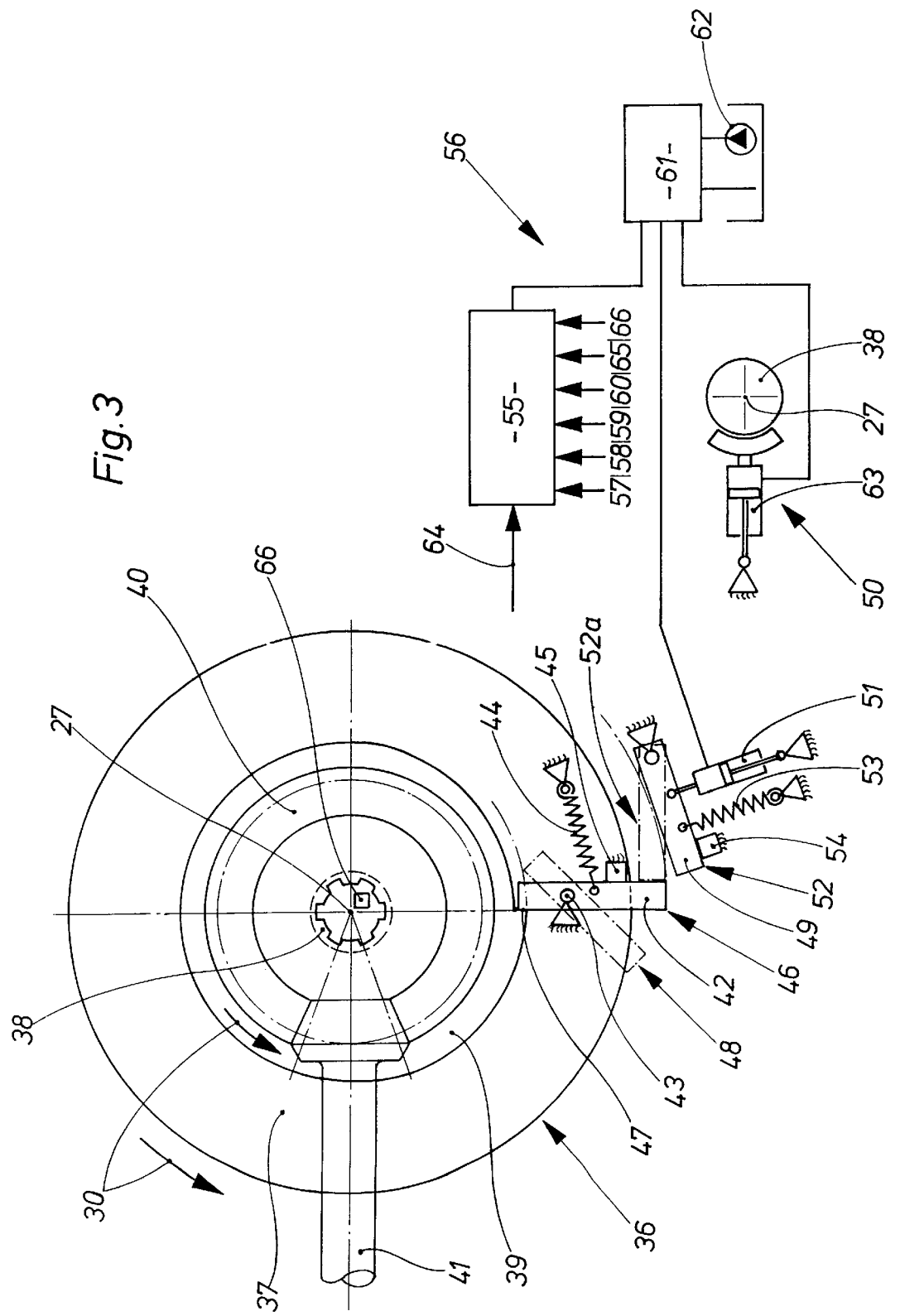
FIG. 3 shows a schematic side view of a first embodiment of a switch mechanism according to the present invention.
Figure 4:
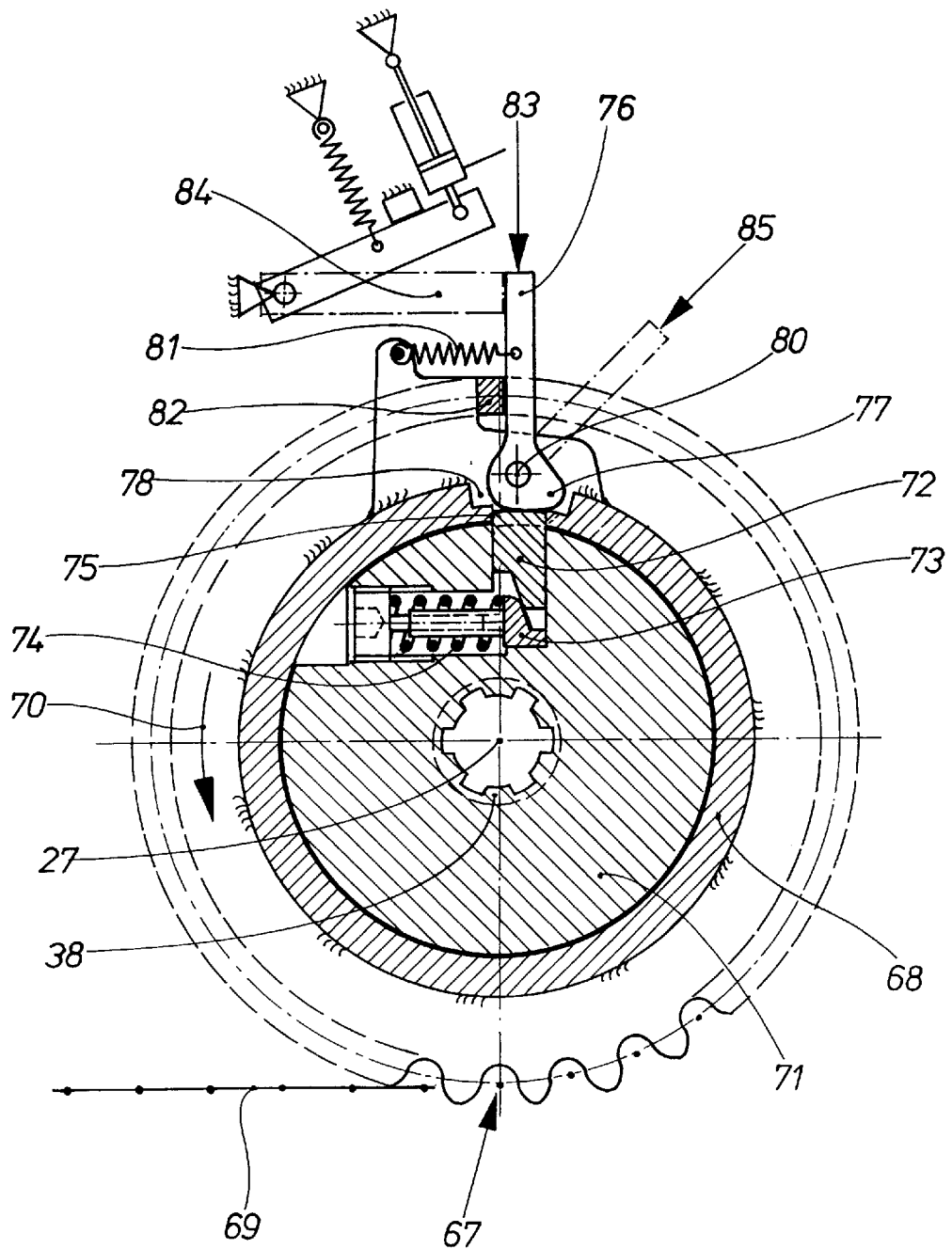
FIG. 4 shows a schematic cross-sectional view of a second embodiment of the switch mechanism according to the present invention.

The baler further includes a pick-up loader 18 which lifts crop laying in swath such as hay, straw or wilted unriped crop from an arable or meadow surface and delivers it to the delivery channel 19. In the embodiment of a baler shown in the drawings a wide pick-up loader is shown. Two cross-feed screws 20 are arranged above the pick-up loader 18. The cross-feed screws are offset backward with respect to the pick-up loader. The two cross-feed screws 20 limit the width of the lifted swath somewhat to the width of the baling channel 1. From the pick-up loader 18, the delivery channel 19 extends horizontally and is bent upwardly before it opens into or opening 21 in the baling channel 1. The crop is delivered into the baling channel 1 from below through the delivery channel 19 and the baling channel opening 21 by two rake conveyors 22, 23. Both rake conveyers 22, 23 are driven by the main drive 7 via the power take-off year 12. The first rake conveyer 22 has a rake with regulated tines 24 the tips of which, during operation, move along a trajectory 25 shown with an arrow 26 in the direction indicated by arrows. Instead of the first rake conveyor 22, a rotor with cutting elements can be provided. The second rake conveyor 23 consists of spaced from each other, rotatable segment members 28 which are supported on a common axle 27 and serve as crop carriers or as pre-pressing elements. The segment members 28 are provided with three teeth 29 at their conveying edge. The teeth 29 have a saw tooth shape and extend backward. During the operation of the baler, the segment members 29 rotate synchronously with the pressure piston 13 in a direction indicated by arrow 30. In the rear position 17 of the pressure piston 13, the segment members 29 occupy a position 31 shown with dash dot lines, and in the front position 16 of the pressure piston 13, the segment members 29 occupy a position shown with solid lines. During their circulation, the segment members 29 run through slots formed in the pressure piston 13. At the end surfaces of the pressure piston 13, the conveying material is stripped from the segment members 29. The drive of the second rake conveyor 23 includes an overload clutch 33 which temporarily turns off the second rake conveyor 23 for a position of the stroke of the pressure piston 13 and then automatically actuates the second rake conveyor 23 for a maximum of 360° degree of its rotation. As an overload clutch, a clutch, which is disclosed and shown in German Publication No. 4,216,483 can be used. During the operation of the baler, the swath-like crop, which is picked up by the pick-up loader 18, is pushed by the first rake conveyor 22 into the delivery channel 19 where the crop is picked-up by the second rake conveyor 23 and is pushed through the baling channel opening 21 into the baling channel 1 in front of the pressure piston 13. When a predetermined length of a bale is achieved, it is bound by a bind material. To this end, a binding needle 34 and a wrapping device 35, shown schematically, are used. FIG. 2 shows a baler provided with an overload clutch for the second rake conveyor 23, which is formed, according to the invention, as with mechanism 36, the first and second embodiments of which are shown in FIGS. 3 and 4, respectively. The switch mechanism can also be formed separately from the overload clutch. The operation of the inventive switch mechanism, however, will be the same, independent of whether if formed as an integral part of the overload clutch or separately therefrom.

FIG. 3 shows a switch mechanism 36 according to the present invention which form an integral part of the overload clutch. The combination overload clutch-switch mechanism includes a disc-shaped driven member 37 which is connected, e.g., by a channel soothing with a drive shaft 38 of the second rake conveyor 23, and a rotatable drive member 39 supported on the drive shaft 38 and fixedly connected with a bevel gear 40. The bevel gear 40 cooperates with a permanently rotatable bevel pinion shaft 41 which is driven by the power take-off gear 12. The drive member 39 and the driven member 37 are force-lockingly connectable by a pivot lever 42 which is formed as a locking member. The drive and driven member 39 and 37 rotate together, during the operation of the baler, in a direction shown by arrow 30. The pivot lever 42 pivots about an axle 43, which supports the driven member 37, and is biased against a stop 45 arranged on the driven member 37 by a biasing force of a tension spring 44 which is arranged between the driven member 37 and the pivot lever 42. In its locking position 46, the pivot lever is engaged in the driver groove 47 formed in the drive member 39. The magnitude of biasing force and the lever arm determine the transmitted torque. When the predetermined torque exceeds, as a result of an overload, a predetermined torque value, the pivot lever 42 pivots clockwise to a position 48 shown with dash-dot lines. Upon pivoting the pivot lever to its position 48, the drive member 39 freely rotates further maximum by an angle of 360°, and the driven member 37 and the rake conveyor 23 remain stationary. The driven member 37 and the conveyor 23 are actuated again when the drive groove 47 of the drive member 39 impacts the pivot lever 42 which is pivoted by the spring 44, after being released, to its initial position 4 (overload control function).

With a small supply of crop, e.g., because of thin swath, the pivot lever 42 is pivoted by a pivotably supported pawl 49 into its second position 48, independent of the torque. As a result of the pivotal movement of the pivot lever 42, the driven member 37 and the drive member 39 are separated from each other. At the same time, the second rake conveyor 23 is being stopped at a position 31 outside of the delivery channel 19, which is shown only symbolically in FIG. 2, by a simultaneously actuated instantaneous brake 50. The rake conveyor 23 remains in this position until a sufficient amount of crop accumulates in the delivery channel 19 so that a sufficient amount is delivered into the baling channel 1 when the rake conveyor is again actuated. The pawl 49 is displaced into its position 52a, shown with dash-dot lines, in the path of the pivot lever 42 by a hydraulic cylinder 51. As a result, the pivot lever 42, after pivoting maximum by 360°, is forcefully brought into its position 48 in which no engagement of the drive member 39 with the driven member 37 takes place. Only after the pawl 49 is pivoted in its initial position 52 against a stop 54 by a spring 53, the drive member 39 drives the pivot lever 42 and therewith the driven member 37, together with the second rake conveyor 23, synchronously with the pressure piston 13. Thus, even with the thinnest swath, an optimal filling of the baling channel 1 is insured. The control of the switch mechanism 36 can be effected in a simple manner with the control unit 55. The control unit 55 is so adjusted that, e.g., at a thin swath, three pressure piston strokes take place between two delivery periods of the second rake conveyor 23. Because the load applied to the pressure piston 13 depends directly on the thickness of the packing pushed into the baling channel 1, the operation of the second rake conveyor 23 can be also controlled dependent on the pressure piston load or dependent on the load applied to the first rake conveyor 22. FIGS. 2 and 3 show, in a very simplified manner, a control block 56 for controlling the operation of the second rake conveyor 23 using the switch mechanism 36.

The entire control circuit is best illustrated in FIG. 2. As shown in FIG. 2, both the second rake conveyor 23 and the pressure piston 13 are associated with respective position sensor 57 and 58 the output signals of which are communicated, through respective electrical conductors, to the control unit 55. The position sensors 57 and 58 measure, respectively, the rotational speed of the second rake conveyor 23 and the number of strokes of the pressure piston 13. A sensor 59 is arranged in the delivery channel 19 for sensing the filling height of the material in the delivery channel 19 or for sensing the initial compression of the material in the delivery channel 19. The output signal of the sensor 59 is likewise communicated to the control unit 55. A position sensor 60 for sensing the position of the pawl 49 likewise has its output connected with the control unit 55. An electro-hydraulic control valve 61 also forms part of the control block 56 which controls the operation of the switch mechanism 36. The operation of the control valve 61 is also controlled by the control unit 55. The control valve 61 controls the flow of a pressure medium from a pump 62 to the first hydraulic cylinder 51 which operates the paw 49. The control valve 61 also controls the flow of the pressure medium to a second hydraulic cylinder 63 which operates the instantaneous brake 50 of the second take conveyor 23. Preset values, which preset a number of strokes of the pressure piston 13 per each revolution of the second rake conveyor 23, are communicated to the control unit 55 via its input 64. If the preset value is equal 1, a single stroke of the pressure piston 13 takes place per each revolution of the second rake conveyor 23. With a preset value equal 3, three strokes of the pressure piston 13 takes place per each revolution of the second rake conveyor 23. With a completely automatic control of the switch mechanism 36, the number of strokes of the pressure piston 13 per each revolution of the second rake conveyor 23 is determined, e.g., by the filling height sensor 59 and/or by a force sensor 65 arranged on the connection rod 14 and which determines the pressure piston load. When the pressure piston load is reduced, e.g., below a predetermined value, the control unit 55 generates a differential signal which controls the control valve 61 so that it actuates the hydraulic cylinder 51 which moves the pawl 49 into the position 52a. Simultaneously, the control valve 61 actuates the hydraulic cylinder 63 of the instantaneous brake 50. As a result, the second take conveyor 23 is held in its stop position 31. Only when the filling height sensor 59 indicates that the predetermined value has been reached, the control valve 61 is controlled so that it provides for the release of the brake 50 and for pivoting of the pawl 49 into its initial position 52, and the second rake conveyor 23, as a result of the engagement of the pivot lever 42 with the driven member 37, performs a filling stroke synchronously with the displacement of the pressure piston 13. To prevent overload of second rake conveyor 23 upon restarting, preferably, e.g., the response torque of the second rake conveyor 23 is determined by a sensor 66 and, taking into consideration the actual position of the pressure piston 13 defined by an output signal of the sensor 66, the filling cycle is timely triggered in such a way that no actuation of the overload protection means 33 of the second rake conveyor 23 takes place. The overload protection means 33 primarily serves to prevent overload in 1:1 region, i.e., at large throughputs.

FIG. 4 shows a combination of a conventional wedge clutch, which functions as a one-turn overload clutch, and an inventive switch mechanism 67. The switch mechanism 67 includes a drive member 68 which permanently rotates, during the operation of the baler, about the drive axle 27 of the second rake conveyor 23. The drive member 68 is rotated by a chain drive 69, shown only schematically, in a direction of arrow 70. A driven member 71, which is arranged coaxially with the drive axle 27, is fixedly connected by a channel toothing with the drive shaft 38 of the second rake conveyor 23. A separate locking member 72 is arranged in the driven member 71. The locking member 72 is pushed by an intermediate member 73 and a spring 74 into engagement with a rectangular recess 75, which is formed in the drive member 68. In this way, the locking member 72 connects the drive and driven members 68, 71 with each other. For disengagement of the locking member 72, a pivot level 76 with an eccentric cam 77 is used. The eccentric cam 77 engages a recess 78 in the drive member 68. The pivot lever 76 is pivotally supported in a bracket 79, which is welded to the drive member 68, by a support axle 88 and is pulled against a stop 82, which is secured on the drive member 68, by a spring 81. In the locking position, the pivot lever 76 occupies a position 83 shown in FIG. 4 with solid lines. In the release position of the drive member 68, the pivot lever 76 occupies a position 85 shown with dash-dot lines and in which the locking member 72 is not engaged in the recess 75. The switch mechanism 67 functions in the same way as the switch mechanism 36 the functioning of which has been described above.

Though the present invention has been shown and described with reference to a preferred embodiment, such is merely illustrative of the present invention, and the invention is not to be construed as to be limited to the disclosed embodiment and/or details thereof, and the present invention includes all modifications, variations and/or alternate embodiments within the spirit and scope of the present invention as defined by the appended claims.

What is claimed is:

1. A baler for forming rectangular bales from harvested crop, comprising a baling channel having an inlet opening; a pressure piston reciprocating in the baling channel and periodically closing and opening the inlet opening of the baling channel; a continuously driven rake conveyor for delivering the harvested crop through the inlet opening of the baling channel synchronously with reciprocating movement of the pressure piston; a switch mechanism for periodically turning off the rake conveyor; means for retaining the rake conveyor for at least one delivery period in an undelivering position thereof outside of a delivery channel; and means for turning on the rake conveyor synchronously with the reciprocating movement of the pressure piston.

2. A baler as set forth in claim 1, wherein a ratio of a number of strokes of the pressure piston per single revolution of the rake conveyor is used as a parameter for controlling the switch mechanism; wherein a turning-off time period of the rake conveyor is pre-adjusted as a set value; and wherein the baler further includes a control unit, sensors for determining, respectively, the number of the pressure piston strokes and a number of revolutions of the rake conveyor and connected with the control unit, and adjusting means for actuating the switch mechanism in accordance with signals generated by the sensors.

3. A baler as set forth in claim 1, further comprising a control unit; a sensor for determining one of a filling level in the delivery channel and an initial compression therein; a sensor for determining pick-up of a swath mass; a sensor for determining a thickness of a crop material in the baling channel; a sensor for sensing a baler speed, one of a sensor for determining a load applied to the pressure piston and a sensor for determining load applied at least to one of a delivery, pressure, and cutting elements arranged upstream of the pressure piston, wherein all of the sensors are connected with the control unit, and wherein operation of the switch mechanism is controlled according to an output signal of at least one of the sensors.

4. A baler as set forth in claim 1, wherein the switch mechanism is formed as one of one-turn clutch, ball-shaped clutch, cam clutch, and wedge clutch that separates the rake conveyor from a rake conveyor drive for a period equal to a time period of at least one pressure piston stroke.

5. A baler as set forth in claim 1, wherein the switch mechanism comprises a drive member rotatable, during operation of the baler, about a rotatable axle, a driven member arranged coaxially with the rotatable axle and fixedly connected with a drive shaft of the rake conveyor, a locking member provided on one of the drive member and the driven member and displaceable against a biased force of a force accumulator, the locking member engaging in locking position thereof, in a driver element of the one of the drive member and the driven member and force lockingly connecting the drive member and the driven member with each other, and means for forcefully disengaging and engaging the locking member from and in the driver element of the one of the drive member and the driven member for disengaging the drive member and the driven member from each other at a predetermined point of time and for subsequently reengaging the drive member with the driven member.

6. A baler as set forth in claim 5, wherein the forcefully disengaging and engaging means comprises a pivot lever secured to the one of the drive member and the driven member, and a pawl pivotable into a path of the pivot lever for displacing the pivot lever into a position in which the drive and driven members are separated from each other.

7. A baler as set forth in claim 1, further comprising an instantaneous brake for retaining the rake conveyor in the undelivering position thereof.

8. A baler as set forth in claim 7, further comprising means for simultaneously actuating both the switch mechanism and the instantaneous brake.

9. A baler as set forth in claim 1, wherein the rake conveyor comprises a plurality of rotatable segment members supported on a common rotational axle and passing through the pressure piston.

10. A baler as set forth in claim 1, wherein conveying rakes of the rake conveyor execute controlled movements.

* * * * *